2,961,320
HUMAN DIETARY PREPARATIONS

William Francis Jack Cuthbertson and George Albert Childs, London, England, assignors to Glaxo Laboratories Limited, Greenford, England, a British company No Drawing. Filed Nov. 5, 1956, Ser. No. 620,174

Claims priority, application Great Britain Nov. 11, 1955

5 Claims. (Cl. 99—56)

This invention is concerned with improvements in or relating to human dietary preparations in dry form adapted to be made up with an aqueous liquid to provide a readily assimilable liquid food. In particular the invention relates to such preparations which provide substantially all the essential requirements for human nutrition and which may be termed "comprehensive diets."

Comprehensive diet preparations in liquid form are of importance in hospitals and similar institutions for the nutrition of patients who, for one reason or another, may be unable to take a normal diet; such preparations may also be of value in circumstances where normal foods are not available or cannot be prepared as for example may be the case in the armed services whilst on active service. Thus whilst one of the prime intended uses of the comprehensive diet preparation is for hospital work, it will be readily appreciated that there are many other circumstances where such preparations will be of value.

Comprehensive diet preparations should contain essentially a readily assimilable protein, a source of calories and, preferably, mineral salts and vitamins, thus giving a composition which supplies all the human nutritional requirements. Hitherto comprehensive diets have frequently been made up in liquid form, for example by hospital dieticians, as and when required. While such diets may be satisfactory from the nutritional viewpoint, they cannot, in general, be stored and the services of a skilled worker are thus required whenever a fresh supply is required. To the best of our knowledge a comprehensive diet able, in itself, to support the entire nutritional requirements of a patient has not previously been prepared in a stable dry form which is adapted to be readily made up with aqueous media into liquid form suitable for ingestion.

It is an object of the present invention to provide a stable, storable, human dietary preparation in solid form which is adapted to be readily made up with aqueous media to form an ingestible liquid.

It will be appreciated that all the constituents of such a solid dietary preparation should be firstly readily dispersible in aqueous media and secondly readily digestible. Those requirements place a considerable limitation upon the constituents which may be used and give rise to particular difficulty in providing that the food should have the necessary calorific value. Carbohydrates are a principal source of calorific value, but virtually the only carbohydrates which are both readily dispersible and readily digestible are the sugars, and to supply the whole of the necessary calorific value with sugars would make the product so sweet as to be unpalatable and would probably also lead to digestive disturbances. To supply some or all of the calorific requirements with fats leads to difficulties in obtaining a dry, stable product; furthermore the fat tends to separate out on dispersion of the product in aqueous media giving an unattractive and unpalatable product. The use of wetting or emulsifying agents to overcome this last difficulty is objectionable in that medical authorities consider that foodstuffs should not contain such substances.

The present invention is based on our discovery that pulverulent, dispersable readily assimilable proteins of low bulk density (volume/weight), are able to absorb and retain a substantial proportion of certain suitable fats and that when these proteins containing absorbed fats are dispersed in aqueous media, a chemically and physically stable dispersion is obtained from which the fats have no substantial tendency to separate under normal conditions of use. It appears that in such dispersions the protein acts as a wetting or emulsifying agent ensuring dispersion of the oil. By taking advantage of this discovery we are thus able to formulate a comprehensive diet preparation in which a substantial proportion of the calorific requirement is provided by a fat thus reducing the proportion of sugar required.

In this way the palatability of the resulting dietary preparation is considerably improved. Furthermore the preparations do not under normal conditions of usage exude fat or appear greasy, although under physical stress (i.e. conditions of unusual heat or pressure) some exudation of fat will of course occur. The solid product remains relatively free-flowing and is readily dispersed in aqueous media. The resultant liquid further exhibits substantially no oiliness as regards taste or appearance.

The palatability of the preparation may be further improved by replacing a further quantity of sugar with a water-soluble dextrin, which is able to supply a proportion of the calorific requirement without adding to the sweetness of the product.

Whilst as stated the nature of the protein used is of prime importance in achieving the object of the invention, it is found that the fat employed must also be of certain restricted nature. Thus the fat must be a stable assimilable bland fat having a melting point below 25° C.

Accordingly the invention provides a human dietary preparation in solid form adapted to be dispersed in aqueous media to provide a liquid food preparation comprising a pulverulent, water-dispersible assimilable protein of low bulk density, and a stable assimilable bland fat having a melting point below 25° C. absorbed in said protein.

The ingestible aqueous media in which the food is dispersed prior to use may be, for example, water or milk, of which water is preferred.

Preferred fats for the preparations according to the invention are those which have a melting point below 15° C., such as arachis oil, sesame oil, olive oil and cottonseed oil; of these arachis oil is preferred for reasons of palatability. Fats having melting points higher than 25° C. are not suitable for use in the invention as they are difficult to incorporate in the protein and tend to separate out on dispersion of the food in aqueous media.

Various proteins may be used for the purpose of the present invention, but such proteins must be of low bulk density (volume/weight) such that they will absorb the fat employed. In practice we prefer to use a protein the bulk density of which is less than 6.5 ccs./gm. although material having a somewhat higher bulk density can be used but with increasing difficulty in handling; however in general it is best that the bulk density of the protein be not less than 4 ccs./gm., again for ease of handling, although we have used with some success a protein the bulk density of which is as low as 2.4 ccs./gm. Protein having a bulk density less than 4 ccs./gm. when used in the present process may also give a product having a more greasy appearance and with poorer flow properties.

The protein must of course be water-dispersible and readily assimilable; furthermore it should preferably have a substantial proportion of its particles in the form of flakes in order to ensure stable absorption of the fat, Examples of proteins which can be used are the assimilable and water dispersible caseinates, particularly the metal caseinates such as calcium and potassium caseinates; other proteins which can be used include soluble egg albumin. It will of course be appreciated that in fact the only restrictions which are placed on the nature of protein is that it should be obtainable in the physical form specified for the purpose of the invention, as well as being palatable and assimilable.

Calcium caseinate is particularly valuable for the purpose of the invention in that it can be readily prepared in a pulverulent flaky form having low bulk density by simple roller drying. Such a roller dried product may be obtained with a bulk density of about 5.5 ccs./gram, and is able to absorb up to twice its weight of a fat suitable for use according to the invention; calcium caseinate of this nature is further available on the market in many countries, being sold in Great Britain under the registered trademark "CASILAN."

In general we prefer to employ a proportion of fat to protein somewhat less than the maximum proportion of fat which the protein will absorb, so as to ensure that there is no substantial tendency for any of the fat to be exuded. Thus whilst calcium caseinate will absorb up to twice its weight of a suitable fat, in fact with this protein we prefer to employ a proportion of fat to calcium caseinate of 1.25:1.

In view of the fact the proteins of the stated type are relatively costly as compared with the other ingredients, we prefer to use only so much of such proteins as is required to absorb the fat used, and to provide the balance of the protein requirement by a cheaper source of protein, which should, of course, be stable, readily assimilated and dispersible in aqueous media. A suitable additional protein source is, for example, a vegetable protein or milk protein e.g. in the form of dried whole cream milk or dried skim milk.

The dietary preparations according to the invention preferably also includes a sugar, such as sucrose or glucose; the whole of the calorific requirement of the patient can be supplied by the fat and the sugar but we prefer to replace a part of the sugar by a water soluble dextrin as this reduces the sweetness of the product thus improving its palatability.

The composition also desirably includes vitamins (preferably all those necessary for human nutrition) and also trace elements; the vitamins required in general include vitamins A, the B group, C, D and E; the trace elements should include sodium, iron, manganese, copper and molybdenum.

We further found that it is preferable that certain of the trace minerals which should be included in the comprehensive diet should be present as salts which are not soluble in water but are soluble in the digestive juices. Thus copper, iron and manganese in the form of their water-soluble salts would tend to inactivate certain of the vitamins during storage of the preparation, which defect appears to be reduced if insoluble salts are used.

Thus we prefer to include iron, copper and manganese in the form of salts thereof which are insoluble in water but soluble in the digestive juices; such salts are for example the carbonates. It will be appreciated that such salts are included in such small proportions in the food that their insolubility does not prejudice ready dispersion in aqueous media and they are, of course, readily solubilized in the intestine.

The absorption of the fat in the pulverulent protein should be carried out under careful conditions; thus if too vigorous conditions of mixing are used only a small proportion of the fat is absorbed and the remainder separates to give a greasy dough as it becomes squeezed out of the protein particles. When the proportions are correctly chosen, for instance less than 2 parts of fat are used per part of roller-dried calcium caseinate, and the mixing is carried out gently, the product remains dry and the mixing should be carried out in such a way that a dry powder is obtained.

The comprehensive diet is preferably prepared by adding the oil soluble vitamins to the fat and carefully mixing the fortified fat with the pulverulent protein derivative; this mix is then added to an intimate mixture of the other constituents and the whole thoroughly blended.

We now describe in greater particularity the detailed preparation of a comprehensive diet according to this invention.

The following procedure is used for the preparation of a 2000 lb. batch of comprehensive diet, and for this procedure three stock mixtures are required, namely (1) vitamin mixture, (2) mineral mixture and (3) oil-soluble vitamins-arachis oil mixture; the preparation of these stock mixtures (in each case sufficient for 10,000 lbs. comprehensive diet) is first described.

Vitamin mixture:
| | G. |
|---|---|
| Ascorbic acid | 500.00 |
| Nicotinic acid | 320.00 |
| Calcium D-pantothenate (Ca content between 8.2 and 8.6% Ca) | 50.00 |
| Aneurine hydrochloride | 45.00 |
| Pyridoxine hydrochloride | 10.00 |
| Vitamin $B_{12}$ | 0.04 |
| Calcium caseinate (Casilan brand) | 777.5 |

After blending the whole mix is micro-pulverised and stored until required.

Mineral mixture:
| | G. |
|---|---|
| Potassium dihydrogen phosphate | 29,750 |
| Sodium chloride | 13,100 |
| Ferrous carbonate, saccharated [2] | 740 |
| Manganous carbonate [1] | 420 |
| Copper carbonate puriss [3] | 100 |
| Sodium molybdate | 4.0 |
| Cobalt oxide | 2.0 |
| Icing sugar | 1,284 |

[1] Manganese content to be not less than 42% manganese.
[2] Iron content to be not less than 33% total iron and 26% ferrous iron.
[3] Copper content to be not less than 52% copper.

The above ingredients are roughly mixed e.g. in a Hobart or Peerless mixer, then micro-pulverised to effect final mixing and stored until required.

Oil-soluble—vitamins—arachis oil mixture:
| | | |
|---|---|---|
| Vitamin A palmitate | i.u. | $120 \times 10^6$ |
| Vitamin $D_2$ | i.u. | $15 \times 10^6$ |
| a-tocopherol acetate | g. | 240 |
| Menaphthone | g. | 50 |
| Arachis oil | lbs. | 30 |

The Menaphthone is dissolved, with the aid of a little heat, in the arachis oil and then the vitamin A palmitate, vitamin $D_2$ and a-tocopherol acetate added. The whole is then thoroughly mixed using a slow speed stirrer and stored away from direct sunlight at a temperature not below 15° C. This stock solution is used for fortifying the arachis oil and care should be taken to see that no separation has taken place during storage.

The 2000 lb. batch of comprehensive diet was prepared in the following stages:

*Stage 1*

Vitamin mixture
Castor sugar 10 lbs. of castor sugar are mixed for 10 minutes e.g. in a small Hobart mixer with 340 g. (¾ lb.) of vitamin mixture.

*Stage 2*

| | Lbs. |
|---|---|
| Soluble dextrin | 220 |
| Castor sugar | 100 |
| Mineral mixture | 20 |
| Sugar-Vitamin mixture from Stage 1 | 10¾ |

These ingredients are added, in the order given, to a blender e.g. a Savage blender and blended for 10 minutes. Spray dried skim milk 1090 lbs. is then added and blending continued for a further 20 minutes.

Stage 3

| | Lbs. |
|---|---|
| Arachis oil | 306 |
| Oil-soluble vitamins-arachis oil mixture | 6 |

The two ingredients are mixed by stirring with a slow speed stirrer for 10 minutes.

Stage 4

| | |
|---|---|
| Calcium caseinate (CASILAN Brand) | 10×25 lbs. |
| Fortified arachis oil from Stage 3 | 10×31 lbs. 3 ozs. (10 × 3.45 gallons). |

25 lbs. of calcium caseinate are introduced into e.g. a large Hobart or Peerless mixer and with the paddle revolving at its slowest speed, 31 lbs. 3 ozs. (3.46 gallons) of fortified arachis oil are slowly added. When all the fortified arachis oil has been added, stirring is continued for not more than 5 minutes. The blended material is transferred to the blender containing the Stage 2 mixture, but mixing in the blender was not commenced until nine further calcium caseinate-fortified arachis oil premixes had been prepared as described above and transferred, in each case, to the blender.

Stage 5

The blender then contains:

| | Lbs. |
|---|---|
| Blended material from Stage 2 | 1,442 |
| Calcium Caseinate oil premixes from Stage 4 | 562 |

This mixture is blended for 15 minutes, before commencing discharge of the material to packing.

It will be appreciated that the foregoing detailed description is given by way of example only and that many modifications both as to ingredients and procedure may be made within the scope of the invention. Thus for example the calcium caseinate may be replaced by another assimilable caseinate, egg albumin or other assimilable protein provided it fulfills the stated requirements of low bulk density and pulverulent flaky form and is readily dispersible. Other fats than arachis oil which can be used include cottonseed oil, sesame oil and olive oil whilst the sucrose can be replaced by other sugars e.g. glucose. Obviously where different ingredients are chosen the proportions thereof may require adjustment particularly to provide a product having the desired balance from the point of view of palatability, physical stability and nutritional requirements.

We claim:

1. A human dietary preparation in the form of a powder dispersible in aqueous media, said preparation containing a protein-fat component consisting essentially of a dry, pulverulent, water-dispersible assimilable protein selected from the group consisting of a caseinate and water-soluble egg albumin, said protein having a bulk density not greater than 6.5 ccs./gm., and a stable, assimilable, bland fat having a melting point below 25° C., said fat having been applied in the liquid state to said dry protein and being present in an amount of about 1.25 to 2.00 parts by weight for each part by weight of said dry protein.

2. The preparation of claim 1 in which the protein is calcium caseinate.

3. The preparation of claim 1 in which the fat is arachis oil.

4. The preparation of claim 1 in which said dry protein has a bulk density of from 4.0 ccs./gm. to 6.5 ccs./gm.

5. A human dietary preparation in the form of a powder dispersible in aqueous media consisting essentially of a mixture of roller-dried calcium caseinate having a bulk density of from 4.0 ccs./gm. to 6.5 ccs./gm., said dried calcium caseinate having absorbed therein arachis oil, the ratio of oil to caseinate being approximately 1.25:1, said arachis oil having been applied in a liquid state to said dried calcium caseinate; milk protein; sucrose; water-soluble dextrin; vitamins A, C, D and E and vitamins of the B-complex; and iron, copper and manganese carbonates as trace elements, said mixture providing a complete human balanced diet.

References Cited in the file of this patent

UNITED STATES PATENTS

| 248,797 | Rothe | Oct. 25, 1881 |
| 613,765 | Hantke | Nov. 8, 1898 |
| 764,294 | Just | July 5, 1904 |
| 891,336 | Hatmaker | June 23, 1908 |
| 1,190,369 | Beckman et al. | July 11, 1916 |
| 1,202,130 | Vasey | Oct. 24, 1916 |
| 1,432,635 | Stevens | Oct. 17, 1922 |
| 2,319,186 | Dugle | May 11, 1943 |
| 2,374,407 | Block et al. | Apr. 24, 1945 |